US008071207B2

(12) United States Patent
Harrington et al.

(10) Patent No.: US 8,071,207 B2
(45) Date of Patent: Dec. 6, 2011

(54) GELATOR STABILIZED CRYSTALLINE RESINS

(75) Inventors: Chris Harrington, Ware (GB); Philip C. Hadley, Ely (GB)

(73) Assignee: Hexcel Composites Limited, Duxford (GB)

( * ) Notice: Subject to any disclaimer, the term of this patent is extended or adjusted under 35 U.S.C. 154(b) by 0 days.

(21) Appl. No.: 12/694,302

(22) Filed: Jan. 27, 2010

(65) Prior Publication Data
US 2010/0124863 A1    May 20, 2010

Related U.S. Application Data

(62) Division of application No. 10/586,567, filed on Jul. 18, 2006, now Pat. No. 7,709,083.

(30) Foreign Application Priority Data

Jan. 20, 2004  (WO) .................. PCT/IB2004/000944

(51) Int. Cl.
*B32B 27/06* (2006.01)
(52) U.S. Cl. ............... 428/306.6; 428/311.1; 428/319.3; 428/319.7; 428/343; 428/346; 427/245; 521/150; 523/456; 524/500
(58) Field of Classification Search ............... 428/319.3, 428/319.7, 311.11, 306.6, 343, 346; 524/500; 523/456; 521/150; 427/245
See application file for complete search history.

(56) References Cited

U.S. PATENT DOCUMENTS 3,666,615 A    5/1972 Yamazaki et al.
4,004,061 A *  1/1977 Creighton et al. ............ 428/349
5,166,229 A    11/1992 Nakano et al.
7,709,083 B2 * 5/2010 Harrington et al. ........ 428/319.3
2002/0086104 A1  7/2002 Yabuta et al.

FOREIGN PATENT DOCUMENTS

EP   1300507 A2   4/2003
EP   1338406 A2   8/2003

OTHER PUBLICATIONS

English Abstract of JP57-167373, Nogami et al Ultraviolet-Curable Tape, Oct. 15, 1982.*
Terech P. et al. : Low Molecular Mass Gelators of Organic Liquids and the Properties of Their Gels, American Chemical Reviews, Easton, US, vol. 97, 1997, pp. 3133-3159.
English Abstract of JP 57-167373, Nogami et al, Ultraviolet-Curable Tape, Oct. 15, 1982.

* cited by examiner

*Primary Examiner* — Leszek Kiliman
(74) *Attorney, Agent, or Firm* — W. Mark Bielawski; David J. Oldenkamp

(57) ABSTRACT

A resin composition that is storable at ambient temperatures. The resin composition forms a cured resin when exposed to a curing agent and heated to a curing temperature that is relatively close to ambient temperature. The resin composition includes a resin component that is composed of a liquid part that is made up of one or more liquid thermosetting resins and a solid part that includes particles of one or more solid thermosetting resins. The liquid part further includes a gelation agent that is present in a sufficient amount to maintain the particles in suspension within the liquid part at ambient temperatures. The viscosity of the resin component changes from a high viscosity state to a low viscosity state when the temperature is increased from ambient temperature to the curing temperature. The high viscosity state is substantially more viscous than the low viscosity state.

20 Claims, 4 Drawing Sheets

GELATOR STABILIZED CRYSTALLINE RESINS

This application is a divisional of U.S. patent application Ser. No. 10/586,567, which was filed on Jul. 18, 2006 and has issued as U.S. Pat. No. 7,709,083.

BACKGROUND OF THE INVENTION

1. Field of the Invention

The present invention relates generally to thermosetting resins and the many different types of compositions that contain such thermosetting resins. More particularly, the invention involves those types of thermosetting resins and compositions that are stored at ambient temperatures and then cured by adding a curing agent and increasing the temperature of the resin to a curing temperature that is relatively close to the storage temperature. The present invention involves providing resins that have a relatively high viscosity at ambient storage temperatures and are suitable for use as adhesives and in prefabricated uncured composites known as prepreg. The resins are converted to a low viscosity material when heated to curing temperatures to provide a rapid flow of the resin that may be required for adequate mixing with curing agents and/or penetration into porous bodies such as fiber bundles and fabric.

2. Description of Related Art

Thermosetting resins are used as a principal ingredient in a multitude of different materials. For example thermosetting resins are widely used alone or in combination with certain additives to form adhesives. Thermosetting resins are also combined with a wide variety of fiber types and configurations to form composite materials. Epoxy resins, vinyl ester resins and cyanate ester resins are examples of thermosetting resins that have been in widespread use for many years.

The curing procedure for thermosetting resins typically involves adding one or more curing agents to the uncured resin to form an activated resin. The activated resin is then usually heated for a sufficient time to completely cure the resin. In many situations, it is desirable to prepare the activated resin and then store it for later use. During storage, the activated resins must be kept at temperatures that are well below the curing temperature of the resin in order to avoid premature curing. For this reason, many activated thermosetting resins cannot be stored at ambient temperatures. Accordingly, it has been common in the past to keep such activated resins refrigerated until they are ready to be used.

Composite materials are used extensively in situations where high strength and low weight are desired. Composites typically include fibers and a resin formulation as the two principal elements. A wide range of fiber types, sizes and orientations have been used in composites. Glass, graphite, carbon, p-aramid, m-aramid, quartz, thermoplastic, boron, ceramic, and natural fibers are common. The fibers can be chopped, stretch broken, randomly oriented, unidirectional in orientation or woven into fabric. The fibers used in composite materials have diameters that range from extremely small to relatively large. Although it is possible to make composites using large diameter fibers, the more common practice is to take thousands of fibers having extremely small diameters and form them into individual bundles known as tows. These multi-fiber tows are much stronger and more flexible than single fibers having the same overall dimensions. Filament bundles can have a wide variety of cross-sectional shapes including ellipsoidal, kidney and pea shapes. The tows can be woven into fabric in the same manner as conventional yarns. Alternatively, the tows are arranged in parallel to provide a unidirectional fiber orientation or they can be randomly oriented.

Thermosetting resins have been widely used as the resin matrix in composite materials. There are a number of ways to combine the resin with the fibers to form the final composite. One approach that has been used for years is to impregnate the fibers with activated resin and allow the resulting "lay-up" to cure at room temperature. The cure time is usually reduced substantially by heating the lay-up. This type of process is well suited for use in the field. However, this wet lay-up process has a disadvantage in that it is difficult to accurately control the amount of resin that is applied to the fibers and ensure that the resin is being uniformly impregnated into the fibers. In addition, the amounts of curing agent and other additives that are added to the resin may vary between lay-ups.

In order to avoid the above problems, it has been common practice to form prefabricated lay-ups that include fibers, resin and curing agent. These prepregs are made under manufacturing conditions that allow the amount and distribution of resin and curing agent within the fibers to be carefully controlled. The prepregs are typically refrigerated during storage and shipping to prevent premature curing of the resin matrix. The need to refrigerate prepreg presents a number of problems. It is expensive to store and ship prepreg on a commercial level because large refrigeration units are required and refrigerated trucks must be used. In addition, the temperature of the prepreg must be continually monitored to detect any increase in temperature due to equipment failure or the like. Increases in temperature, even for short periods of time, can adversely affect the shelf life and function of the prepreg and result in the prepreg being discarded.

One approach to eliminating the need for refrigeration of prepreg involves placing the resin and curing agent in the prepreg structure so that they are physically separated from each other. For example, the resin and curing agent can be located on opposite sides of a layer of woven fabric to form a prepreg that can be stored indefinitely at room temperature as described in U.S. patent application Ser. No. 648,159. When ready for use, the prepreg is heated, usually under pressure, so that the resin and curing agent flow into the fabric to initiate the curing process. The basic approach used in these types of systems is to store the resins and curing agents as separate entities that are in sufficiently close proximity to each other so that they can be mixed together by heating. This type of approach can also be used for thermosetting adhesives and other applications where the structure of the system allows the resins and curing agents to be kept in close proximity to each other without contact. Such systems typically include a porous body of some type that provides the structure in which the resin and curing agents are located.

There are a number of desirable properties that the resins and curing agents should have in order to be used in the ambient temperature storage systems described above. For example, the resin should be sufficiently viscous at room temperature so that it does not flow to any appreciable extent into contact with the curing agent. At the same time, the resin must retain sufficient tackiness and other properties that are desirable in a prepreg. The resin should be convertible to a relatively low viscosity material when heated to provide rapid and thorough mixing of the resin and curing agent. The change in resin viscosity should occur at temperatures that are relatively close to room temperature. For example, the viscosity change should preferably occur within 10° C. to 60° C. above ambient temperatures.

There is a present and continuing need to develop resins that are suitable for use in prepreg and other systems of the type described above that can be stored at ambient temperatures. In addition, there is a present and continuing need to develop prepreg and other system configurations that include resin/curing agent combinations that can be stored at ambient temperatures while still demonstrating the ability to undergo efficient cure at temperatures not significantly higher than ambient temperature. Cure temperatures below 100° C., more preferably below 80° C., and most preferably as low as 60° C. are of increasing interest to resin and/or prepreg converters because the use of these temperatures offers significant benefits in terms of energy consumption. Furthermore, as the cure temperature is decreased the processing equipment needed to cure the epoxy resin formulations becomes somewhat simpler and less expensive. For example, it becomes possible to use temporary, bespoke curing ovens constructed using inexpensive, but relatively temperature-sensitive components such as wood and polyolefinic sheeting. The resins should undergo relatively large reductions in viscosity over relatively small increases in temperature to provide thorough mixing of the resin and curing agent as well as uniform distribution of the resin throughout the cured structure.

SUMMARY OF THE INVENTION

In accordance with the present invention, resin compositions are provided that may be used in prepreg and other systems that are stored at ambient temperatures. The resin compositions form a cured resin when exposed to a curing agent and heated to a curing temperature, preferably under pressure, that is higher than ambient temperature. The resin composition includes a liquid part that is composed of one or more liquid thermosetting resins and a solid part that is composed of particles of one or more solid thermosetting resins wherein the solid part is dispersed within the liquid part. The particles have a melting point that is above ambient temperature and below the curing temperature. The liquid part further includes a gelation agent that is present in a sufficient amount to form the liquid part into a gel that is sufficiently gelatinous to maintain the particles in suspension within the liquid part at ambient temperature. The gelation agent has a melting temperature that is below the curing temperature such that the viscosity of the resin changes from a high viscosity state to a low viscosity state when the temperature of said resin composition is increased from ambient temperature to the curing temperature. This decrease in viscosity is enabled not only by the thermal breakdown of the gelation agent, but also by fusion of the crystalline resin particles. Unlike higher molecular mass (substantially amorphous) epoxy resins, the melt transition of crystalline resins, as used in this invention, occurs over a narrow, predictable, and well defined temperature range. This invention exploits this characteristic of crystalline resins to advantage in controlling the viscosity profile of the resin formulation as a function of temperature.

The resins of the present invention are useful in situations where it is desirable to use relatively small increases above ambient temperature to convert the resin from a relatively viscous and tacky material to a flowing material that can penetrate porous structures, such as fiber bundles and fabric that contains fiber bundles. The invention covers compositions that include an uncured resin component, a curative component and a porous body, such as a fiber bundle, a woven fabric or a non-crimped textile. The resin component and curative component are placed within or on the porous body at separate locations so that they do not interact to any substantial degree. The viscosity of the resin component in the high viscosity state is sufficient to prevent the resin component from flowing into or out of the porous body to thereby limit mixing with the curative component. As a feature of the present invention, heating of the composition to temperatures only slightly above ambient temperatures converts the resin component into the low viscosity state. The resin component, in the low viscosity state, is sufficiently fluid that it flows into contact with the curative component to provide thorough mixing. In addition, the low viscosity form of the resin component flows into and/or out of the porous body to provide uniform distribution of the resin throughout the cured composition.

The above described and many other features and attendant advantages of the present invention will become better understood by reference to the following detailed description when taken in conjunction with the accompanying drawings.

BRIEF DESCRIPTION OF THE DRAWINGS

FIG. 5D is a diagrammatic representation of an adhesive in accordance with the present invention wherein the curative component and the resin component are separated by a fusible barrier.

DETAILED DESCRIPTION OF THE INVENTION

Figure 1:
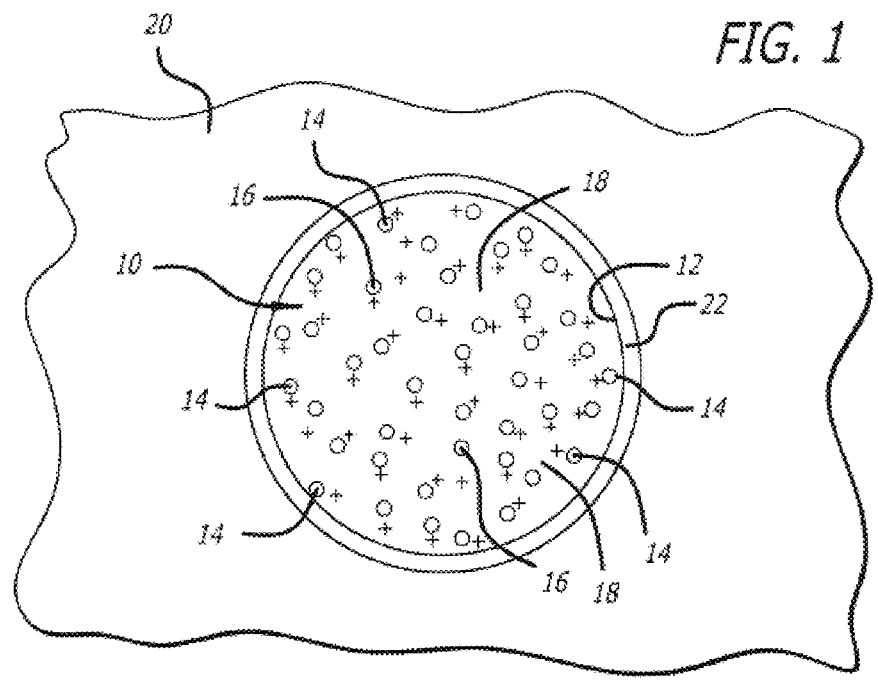
FIG. 1 is a diagrammatic representation of an exemplary embodiment of the present invention where the porous body is a tow or yarn of fibers wherein the resin component is located on the exterior of the tow and the curing component is located within the interior of the tow.

Resin compositions in accordance with the present invention are intend for use in situations where the uncured resin is stored at ambient or room temperature over extended periods of time. For the purposes of this specification, "ambient" or "room" temperature is considered to be temperatures between about 10° C. and about 30° C. More preferably, ambient or room temperature is between about 20° C. and 25° C. The uncured resin compositions form a cured resin when exposed to a curing agent and heated to a curing temperature that is higher than the ambient temperature at which the uncured resin is stored. The difference between the ambient storage temperature and the curing temperature ranges between 10° C. and 60° C. Curing temperatures of 40° C.-90° C. are preferred. The resin compositions are in a high viscosity state when the uncured resin is at ambient temperatures. The viscosity of the uncured resin in the high viscosity state is such that the resin does not flow freely, but still retains a certain degree of tackiness that is required in many applications. The viscosity of the uncured resin in the high viscosity state is preferably between about 20 Pas and 70 Pas.

In the high viscosity state, the uncured resin can be stored in relatively close proximity to curative components that contain one or more curing agents. When the temperature of the resin composition is increased from ambient temperature to the curing temperature, the uncured resin is converted to a low viscosity state. The uncured resin is substantially more viscous in the high viscosity state than in the low viscosity state. The uncured resin in the low viscosity state is able to flow relatively freely into contact with the curative component. The viscosity of the uncured resin in the low viscosity state is preferably between about 10 Pas and 0.1 Pas.

The uncured resin includes a liquid part that contains one or more liquid thermosetting resins and a solid part that includes particles of one or more solid thermosetting resins that are dispersed within the liquid part. The liquid thermosetting resins may be any of the resins that can be stored at ambient temperatures and that can be cured with appropriate curing agents at the curing temperatures set forth above. Resins that are suitable include epoxy resins, vinyl esters, unsaturated polyesters, isocyanates, phenolics and cyanate esters. Exemplary resins include epoxy resins such as the glycidyl derivatives of bisphenol A and bisphenol F; the glycidyl derivatives of p-aminophenol and m-aminophenol; monoglycidyl derivatives of aromatic, aliphatic and alicyclic alcohols such as cresyl glycidyl ether, t-butylphenyl glycidyl ester of neo-decanoic acid; polyglycidyl derivatives of polyhydroxy compounds such as glycerol, trimethylolpropane and butanediol; 3,4-epoxycyclohexylmethyl 3,4-epoxycyclohexanecarboxylate, vinylcyclohexene dioxide, hydrogenated bisphenol A diglycidyl ether, bis(2,3-epoxycyclopentyl)ether, the diglycidyl ester of 1,2-cyclohexanedicarboxylic acid, diglycidyl phthalate; aliphatic amines such as 1,3-propanediamine, N,N-diethyl 1,3-propanediamine, triethylene tetramine, diethylene triamine, 4,7,10-trioxadecane-1,13-diamine, m-xylylene diamine; aromatic amines such as benzyldimethylamine, benzylamine, 2-4-diethyl toluene diamine and its mixtures, 2,4-dithiomethyl toluenediamine, tris(dimethylaminomethyl)phenol; alicyclic and heterocyclic amines such as 1,3-cyclohexane diamine, 1,2-cyclohexane diamine, isophorone diamine, p-menthane diamine, methylenebis-(4-cyclohexylamine) and its alkyl substituted derivatives, 1,3-bis-(aminomethyl)cyclohexylamine, aminoethyl piperazine, bis (aminopropyl)-piperazine, 1-methylimidazole and other imidazoles; anhydrides such as hexahydrophthalic anhydride, methylhexahydrophthalic anhydride, methyl nadic anhydride; cyanate esters such as the dicyanate esters of bisphenol E, bisphenol A, bisphenol F; vinyl esters such as the acrylate and methacrylate esters of bisphenol A diglycidyl ether and their substituted derivatives and their mixtures with monomeric diluents such as styrene, methacrylates and acrylates; diluents and flexibilizers of many classes well known in the art; flame retardants such as those containing phosphorous, including phosphates and phosphonates; catalysts such as boron trihalides and their amine adducts and mixtures thereof with diluents and carriers; peroxides and hyperoxides.

The liquid part also includes a gelation agent that is present in a sufficient amount to form the liquid part into a gel that is sufficiently gelatinous to maintain the solid particles in suspension. The gelation agent should have a melting point that is below the curing temperature to which the uncured resin composition is heated. The gelation agent is preferably a non-polymeric gelator. Any suitable non-polymeric gelator may be used that is capable of forming the resin composition into a gel that is able to suspend the solid particles and has a viscosity that is sufficiently high in the high viscosity state to prevent or minimize flow of the resin composition. A number of suitable gelators that may be used in the resin compositions of the present invention are identified in a co-pending United Kingdom Application entitled "IMPROVEMENTS IN OR RELATING TO THERMOSETTING RESIN COMPOSITIONS" (Serial No. 0303257.0, filed Feb. 13, 2003). The content of this United Kingdom patent application is hereby incorporated by reference.

Compounds that may be used as the gelation agent include alkyl ethers of phenols, especially di-functional and tri-functional phenols. The alkyl moiety of the alkyl ether is preferably within the range of hexyl to ocatadecyl. Exemplary compounds include octyl to octadecyl ethers of catechol, resorcinol, hydroquinone, 4,4'-biphenol, the naphthalene diols, the antracene diols, the antraquinone diols, pyrogallol, phloroglucinol, stilbene diols and derivatives thereof The derivatives may be optionally substituted on either the aromatic ring(s) or the alkyl chain moieties. Examples of suitable substituents for the aromatic ring(s) comprise: $C_1$ to $C_4$ alkyl; aryl (such as phenyl); $C_5$ or $C_6$ alicyclic rings; halogen; nitro; alkyl ester; and alkyl amide. Preferably the alkyl moieties of the aforementioned alkyl ester and alkyl amide substituents comprise 1 to 4 carbon atoms. In addition, there may be one or more functional groups on the aromatic ring(s) or on the alkyl moiety which enable the gelator to react chemically with the one or more constituents of the liquid composition which it is being used to gel. Especially useful functional groups in this respect are carboxylic acid, amine, thiol, hydroxyl, oxirane (epoxy), isocyanate, cyanate, allyl and vinyl groups. For example, carboxylic acid-functionalized gelators are capable of reacting with epoxy resins during the curing stage, and allyl- and vinyl-functionalized gelators are capable of reacting with vinyl ester and unsaturated polyester resins during the curing stage.

The above-described gelation agents may be prepared by any of the methods known in the literature. For instance, the phenyl ether gelators which find use in this invention may be prepared via the Williamson synthesis involving the reaction of a phenate salt with an alkyl halide in the presence of a base in the suitable solvent. Reduction of esters and the reaction of the phenol with the appropriate α-olefin are other potential routes. Other reaction conditions may also be employed, for example, the use of supercritical fluids such as carbon dioxide may facilitate the reaction.

The alkyl ureas of aromatic isocyanates are also considered to be particularly suitable gelation agents. Suitable isocyanates are toluene diisocyanate, 1,4-phenylene diisocyanate, methylenebis(4-phenylisocyanate), xylene diisocyanate, 1,8-naphthalenediisocyanate. Preferably, the carbon chain length is in the range 6 to 18 carbon atoms. The urea compounds may alternatively be made by taking the alkyl isocyanate and reacting with the relevant aromatic diamine. As such, the preferred route will be determined by the availability of the amine and isocyanate component.

The quantity of gelation agent that is present in the liquid part can be varied and will depend upon a number of factors. These factors include the types of resin or resins used, the amount and size of solid particles that are to be suspended in the gel and the particular gelation agent. In general, the amount of gelation agent that is required to obtain the above identified high and low viscosity states can be determined by routine experimentation. Typically, the amount of gelation agent will be in the range of from 1 to 10 percent by weight of the liquid part of the resin composition. About 5% gelation agent by weight is preferred.

The solid part of the resin composition is composed of solid particles that are sufficiently small that they can be suspended in the liquid part. Particle sizes that range from 10 mm down to 0.001 mm are suitable. Particles that are smaller than 5 mm are preferred with particle sizes of less than 0.5 mm being particularly preferred. The particles can be made from any thermosetting polymer or resin that is solid (crystalline) at room temperature and has a melting point that is below the curing temperature selected for the particular resin composition. Exemplary preferred solid particles are made from materials such as, crystallized Ruetapox 0158 that is available from Bakelite AG (Duisberg, Germany) and crystallized DER 332 that is available from Dow Chemical Company (Wilmington, Del.).

Like the gelation agent, the amount of solid particles in the uncured resin composition will vary depending upon the same type of factors. An overriding consideration is that the particles must remain suspended in the liquid part for relatively long periods of time at ambient temperatures. The actual amount of solid particles needed to achieve the target high and low viscosity states can also be determined by routine experimentation. Typically, from 0.5 to 10 parts by weight particles will be added to 1 part by weight of the resin/gelation agent mixture.

The uncured resin compositions are preferably prepared by dissolving the gelation agent in the liquid resin at an elevated temperature. Temperatures on the order of 80° C. to 120° C. are preferred. Once the gelation agent is dissolved, the liquid part is cooled to a temperature that is no lower than about 30° C. The solid particles are then added and thoroughly mixed into the liquid part. The resulting resin composition is then applied to a porous body or formed into a film or other configuration depending upon the final intended use. Once the resin composition has been manipulated into the appropriate configuration or form for storage, it is cooled further to ambient temperature. At ambient temperature, the resin composition is in the high viscosity state and can maintain the solid particles in suspension for relatively long storage times. Storage times may be as short as a few hours or as long as a few months or more.

The uncured resins are preferably stored in combination with a curative component that is located in close proximity to the resin, but not in chemical contact therewith. The resin and curative component may simply be stored side by side with a barrier located between them. However, it is preferred that the resin and curative component be stored in combination where one or more porous bodies that provide a structure on which the two components may be stored in close proximity without chemical contact. The porous body can be anything that has an exterior surface and interior surfaces that are located within the porous body. The preferred porous bodies are those composed of the fibers that are used in making composite materials. Other porous bodies that may be used include open cell foam, honeycomb and thermoplastic scrims.

A single tow of fibers may be considered to be a porous body in accordance with the present invention. As shown in FIG. 1, the tow of fibers shown generally at 10 includes an outer discontinuous circular surface (represented at 12) that is formed by the outer surfaces of the individual filaments 14 that are located at the surface of the tow 10. The tow 10 also includes interior filaments 16 that have surfaces which define the interstitial spaces 18 located within the tow 10. The curative component is distributed on the surfaces of the interior filaments 16 or within the interstitial spaces 18 as represented by the "+'s". The resin component completely surrounds the tow 10 as shown at 20. At room temperature, the resin is in its high viscosity state and remains substantially in place and does not flow into the interstitial spaces. When heated to its low viscosity state, the resin flows into the interstitial spaces where it mixes with the curative component, fills the interstitial spaces and wets all of the dry surfaces of the interior filaments. If desired, an optional removable reaction barrier 22 is provided to keep the resin component from contacting any of the filament surfaces. Without the barrier 22, the resin wets the outer surfaces of the exterior filaments 14. The removable barrier is preferably made from a thin polymeric film that melts or otherwise is dissolved by the resin at temperatures between the ambient temperature at which the composition is stored and the curing temperature. Examples of suitable barrier film materials include aqueous film-forming emulsions and dispersions of polyethylene; oxidized polyethylene; ethylene copolymers with acrylic and methacrylic esters and acids; polyethylene waxes; carnauba wax and other naturally derived waxes. Thin films of polyethylene, poly(ethylene-co-propylene) and other ethylene copolymers; either applied as hot melts or from solution can also be used.

The curative component that is eventually combined with the resin component includes one or more curing agents that may or may not be dissolved or otherwise suspended in a carrier. The curing agent(s) are selected such that they provide curing of the resin component when combined therewith at temperatures equal to or below the above stated curing temperatures. The amount of curing agent required to provide adequate curing of the resin component will vary depending upon a number of factors including the type of resin being cured, the desired curing temperature and curing time. Curing agents typically include cyanoguanidine, aromatic and aliphatic amines, acid anhydrides, Lewis Acids, substituted ureas, imidazoles and hydrazines. The particular amount of curing agent required for each particular situation may be determined by well-established routine experimentation. Exemplary preferred curing agents include imidazole (1,3-diaza-2,4-cyclopentadiene) available from Sigma Aldrich (St. Louis, Mo.) 2-ethyl-4-methylimidazole available from Sigma Aldrich and boron trifluoride amine complexes, such as Anchor 1170, available from Air Products & Chemicals, Inc. (Allentown, Pa.).

The curing component, if desired, may include a carrier for the curing agent. The curing agents are suspended or dissolved in the carrier with the resulting mixture applied to the porous body or other surface where mixing with the resin will eventually take place. Exemplary carriers include ketones, such as acetone or methylethylketone or low molecular weight polyethyleneglycol. The amount of curing agent added to the carrier and the carrier type will vary depending upon where the curing agent is to be located and the physical form of the curative once deposited. When the curing agent is to be located in a porous body, such as a fiber tow, the carrier must be sufficiently liquid to penetrate into the tow. In situations where the curing component is in the form of a film, the carrier must be sufficiently viscous to form such films. The carrier can remain associated with the curative, for example in the case of BF3 complexes hosted in polyethyleneglycol, the curative formulation being designed such that the presence of the carrier does not interfere negatively with the cured performance of the assembly. Alternatively, the carrier can simply be used as a method for impregnation of the curative on the fabric where the carrier would typically be a higher volatility solvent such as the aforementioned methylethylketone or acetone, that is removed in a subsequent processing step leaving the reactive curative isolated on the porous body. Particularly exemplary of this mode of operation is the deposition of reactive solid imidazole curatives on porous bodies from acetone.

Figure 2:
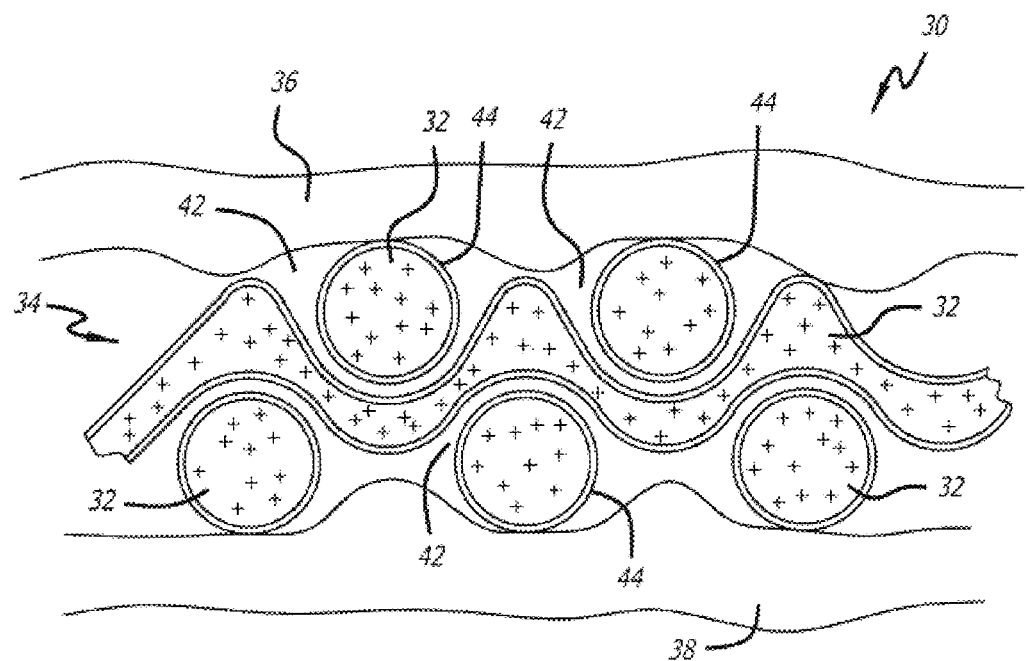
FIG. 2 is a diagrammatic representation of a prepreg in which fiber tows of the type shown in FIG. 1 are woven to provide a porous body that is impregnated with uncured resin.

FIG. 2 is a diagrammatic representation of a prepreg 30 in which fiber tows 32 of the type shown in FIG. 1 are woven into a fabric 34 that is coated on either side with resin layers 36 and 38. The woven fabric 34 may be viewed as a compound porous body that has discontinuous outer surfaces on either side of the fabric and interstitial spaces 42. In addition, each of the fiber tows 32 forms a porous body as described previously. Accordingly, there are porous bodies (tows) located within the porous body (fabric). The present invention is especially well suited for use in prepreg because the large reduction in viscosity that is obtained when going from the high viscosity state to the low viscosity state provides relatively complete and rapid penetration of both the overall fabric and the individual tows. Since the curing agents (+'s) are located in the tows, it is necessary that the resin completely penetrate into the tows to provide uniform curing. The tows 32 in FIG. 2 are shown having optional removable barriers 44 surrounding each tow. It should be noted that a single fabric layer 34 is shown sandwiched between two resin layers 36 and 38. In alternative embodiments, multiple fabric layers can be used where not all of the layers include the curative component. For example, the fabric layer 34 can be sandwiched between two additional fabric layers that do not include a curative component. The resin layers on the outside of the structure, when converted to the low viscosity state, would then penetrate through the additional layers before contacting the curative component.

Figure 3:
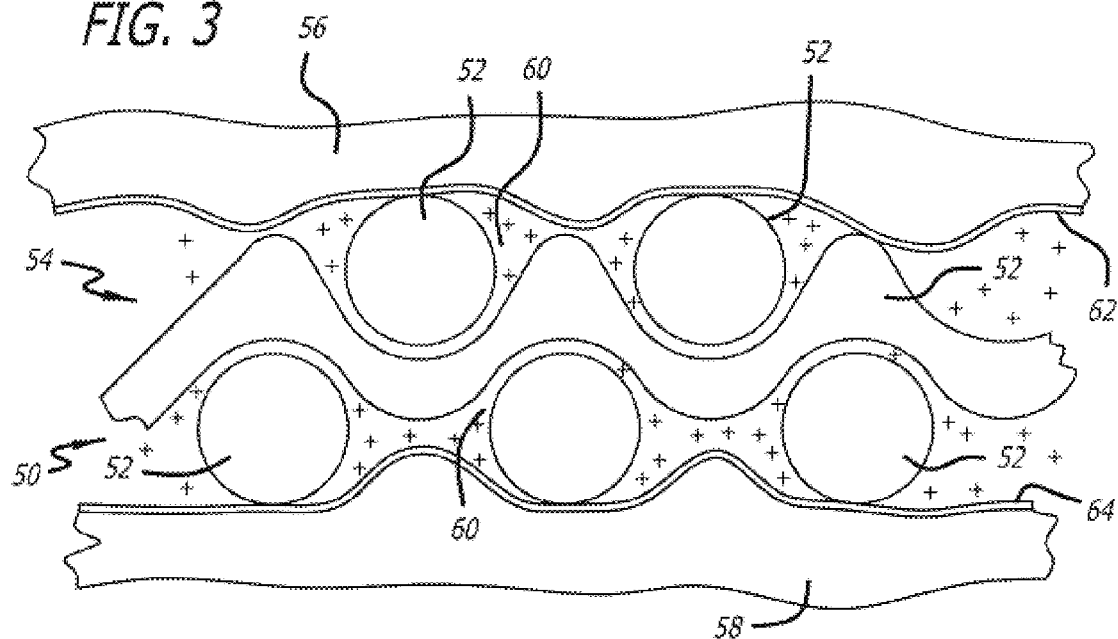
FIG. 3 is a diagrammatic representation of a prepreg in which the porous body is woven fabric that has be impregnated with the curative component. The uncured resin is provided as a film that is located on either side of the fabric.

Another exemplary prepreg is shown generally at 50 in FIG. 3. This prepreg is similar to the prepreg shown in FIG. 2 in that it includes fiber tows 52 that have been woven into a single layer of fabric 54 that is sandwiched between two layers of resin 56 and 58. The prepreg is shown at ambient temperature. At this temperature the resin component is in the high viscosity state which is sufficient to prevent a substantial amount of the resin component from flowing into or out of the interstitial spaces 60 and/or away from the exterior surfaces of the fabric 54. In this embodiment, the curative component (+'s) is located within the interstitial spaces of the fabric and not limited to the interstitial spaces of the tows. Optional removable reaction barriers are shown at 62 and 64. The removable reaction barrier is preferable in situations where it is desirable to eliminate any possible contact between the uncured resin and curing agent that might occur at the interface between the two components.

Four exemplary embodiments of prepreg made using the resin component of the present invention are shown in FIG. 4. The prepreg 410 shown in FIG. 4A has a resin component in the form of resin layer 412, a curative component in the form of curing agent layer 414 and a porous body in the form of dry fabric layer 416. During storage at ambient temperature, the resin remains in a high viscosity state and does not flow to any substantial degree into the fabric layer 416. In accordance with the present invention, when the prepreg 410 is heated under pressure to curing temperature, the resin is converted to the low viscosity state and flows through the fabric layer 416 and into contact with the curative component 414.

Figure 4A:
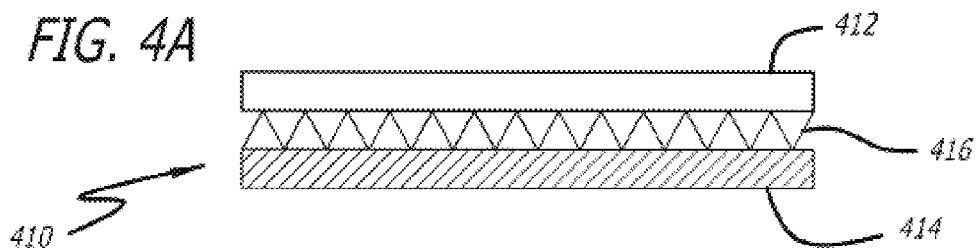
FIGS. 4A-4D are diagrammatic representations of four exemplary prepreg configurations in accordance with the present invention.
Figure 4B:
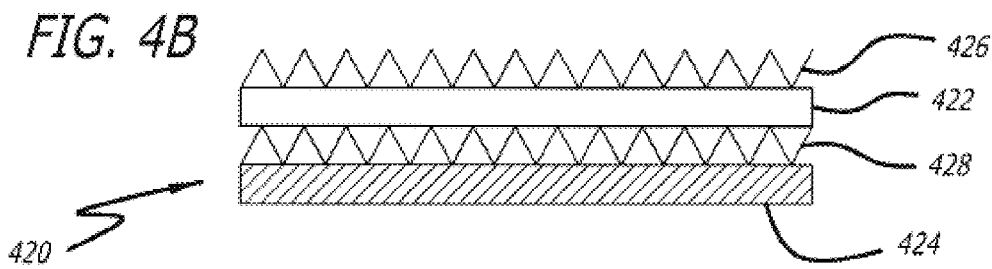
Figure 4C:
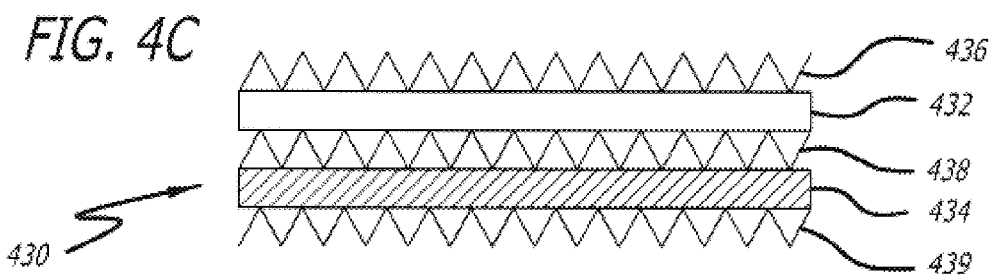
Figure 4D:
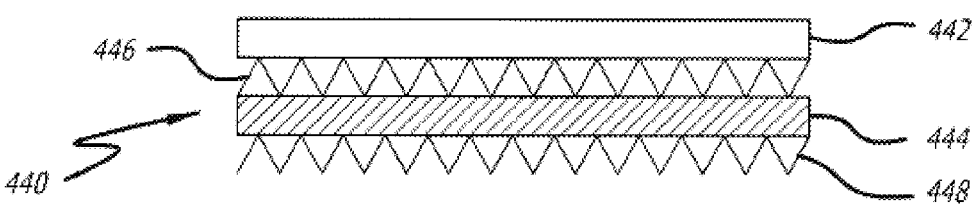

The prepreg shown at 420 in FIG. 4B is similar to the prepreg 410 except that it includes two fabric layers 426 and 428 as well as the resin layer 422 and curing agent layer 424. In accordance with the present invention, the resin component in the low viscosity state is sufficiently fluid that is mixes thoroughly with the curing agent and also penetrates both fabric layers. Another prepreg configuration is shown at 430 in FIG. 4C. The prepreg 430 includes resin layer 432 and curing agent layer 434 that are separated by and sandwiched between fabric layers 436, 438 and 439. The resin becomes sufficiently fluid in the low viscosity state to flow throughout the structure to provide uniform mixing of resin and curing agent as well as uniform penetration of all three fabric layers. Prepreg 440 shown in FIG. 4D includes resin layer 442, curing agent layer 444 and fabric layers 446 and 448. The prepregs shown in FIG. 4 are all similar in that both the resin component and curative component are in the form of thin films that are separated from each other by at least one layer of fabric.

Figure 5A:
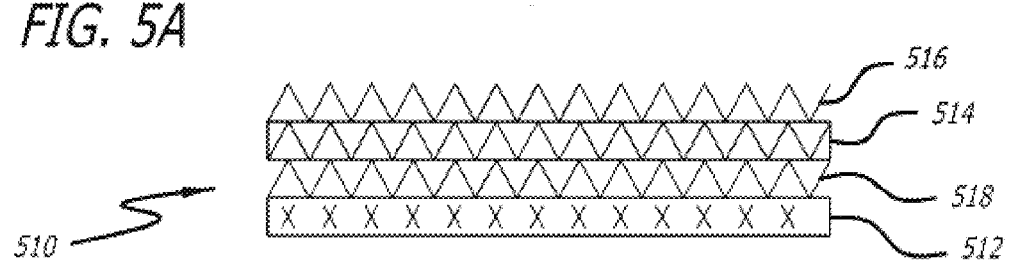
FIG. 5A-5D are diagrammatic representations of three exemplary prepreg configurations in accordance with the present invention.
Figure 5B:
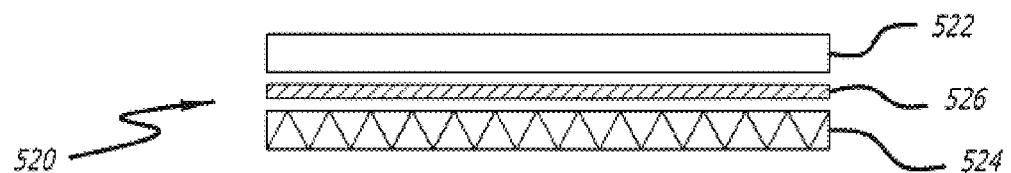
Figure 5C:
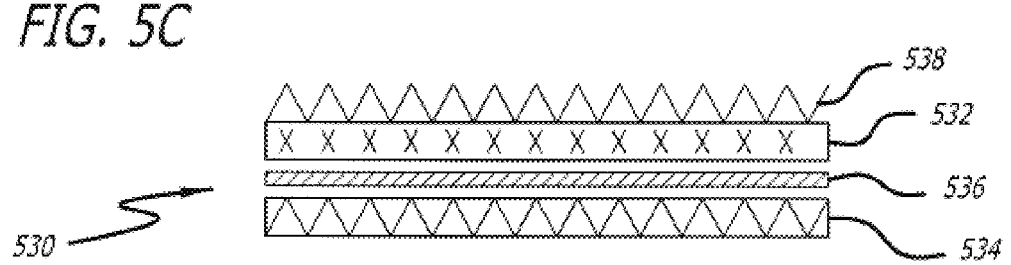

Three more embodiments of prepreg in accordance with the present invention are shown diagrammatically in FIGS. 5A-5C. Prepreg 510 (FIG. 5A) includes a resin component 512 that is composed of a fabric layer that has been impregnated with an excess amount of uncured resin. It should be noted that only the layer 512 has an excess amount of uncured resin. The overall assembly of 510 continues to have the usual "full" amount of resin which is typically around 35% by weight. The curative component 514 is in the form of a layer of fabric that has been impregnated with the curing agent. The layer of resin-impregnated fabric 512 is separated from the layer of curing agent impregnated fabric 514 by a dry layer of fabric 518. An additional layer of dry fabric 516 may optionally be added to the prepreg, if desired. Such fabric that has been impregnated with curing agent is disclosed in French Patent application No. 0210769 and co-pending U.S. patent application Ser. No. 10/648,159. The contents of these applications are also specifically incorporated by reference.

In FIG. 5B, a prepreg 520 is shown where the resin component is in the form of resin film 522 that is separated from "hardenerpreg" layer 524 by a removable reaction barrier film 526. "Hardenerpreg" is a term of art used to describe fiber or other types of reinforcement material that has the curative dispersed in, and/or on the reinforcement and wherein the reinforcement is free of resin. The prepreg 530 in FIG. 5C includes a layer of fabric 532 that has been impregnated with excess resin and a hardenerpreg layer 534. The hardenerpreg 534 and resin-impregnated fabric 532 are separated by a removable reaction barrier film 536. An additional dry fabric layer 538 may be placed on top of the saturated resin impregnated layer 532, if desired.

Figure 6:
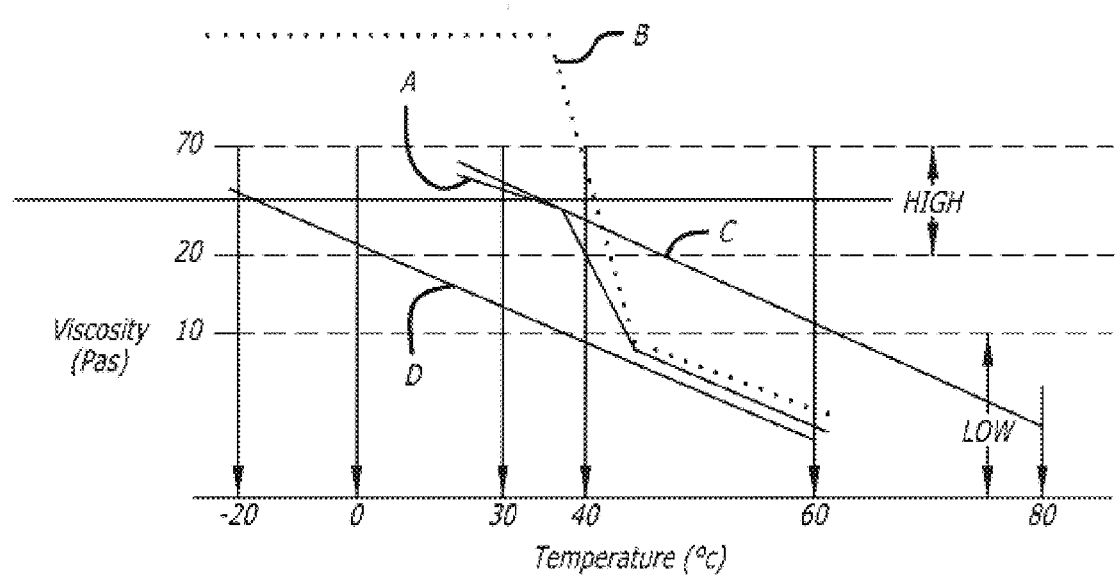
FIG. 6 is a graphic comparison of the viscosity vs. temperature profile between the present invention and other resin systems.
Figure 5D:
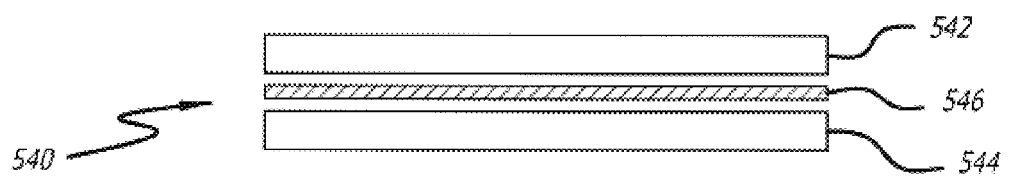

An uncured resin composition in accordance with the present invention is shown at 540 in FIG. 5D. The resin composition is intended for use as an adhesive or in other situations where the uncured resin is not stored as part of a prepreg or other porous body. The composition 540 includes a resin layer 542 and a curing agent layer 544. A removable reaction barrier 546 is used to separate two layers 542 and 544 from each other A common feature in all of the above-described embodiments is that the uncured resin must change from a high viscosity state to a low viscosity state over a relatively small increase in temperature above ambient temperature. This change is necessary to ensure uniform mixing and penetration during the curing process. FIG. 6. is a graph showing the relationship between the viscosity and temperature of a given resin. The viscosity range of the resin in the high viscosity state is shown by the dotted lines labeled "HIGH". This is the viscosity range that is required to allow room temperature (ambient) handling and storage of the resin. The viscosity range of the resin in the low viscosity state is shown by the dotted lines labeled "LOW". This is the viscosity range required for adequate infusion of the resin into fabric layers and other porous bodies during curing.

Uncured resins in accordance with the present invention have a viscosity profile as shown at A in FIG. 6. As can be seen, the resin remains in the high viscosity state throughout the ambient temperature range. At temperatures slightly above the upper limit of ambient temperature (30°), the viscosity drops from the high viscosity state to the low viscosity state. This is to be contrasted with resins loaded with particles that have the viscosity profile shown at B. These particle-loaded resins have a sharp viscosity transition at temperatures in the same range as the present invention. However, as can be seen from FIG. 6, the viscosity of these resins at ambient temperatures is too high to provide adequate prepreg handling characteristics. The viscosity profiles of two non-modified or non-loaded conventional thermoset resins are shown at C and D. Neither of these resins exhibit the sharp transition from a high viscosity state to a low viscosity state that is required by the present invention as shown at A. Example D can be seen to demonstrate an acceptably low viscosity at a suggested curing temperature of 60° C., but this is inseparable from it possessing a viscosity too high at ambient storage temperature (this manifesting itself particularly as a tack level that is too low). Example C on the other hand has an acceptable viscosity and tack at ambient temperature, but the form of its viscosity profile as a function of temperature means that the viscosity does not fall low enough for efficient impregnation at the curing temperature.

Examples of practice are as follows:

EXAMPLE 1

An uncured resin component was prepared by first combining DER 337 resin available form Dow Chemical Company (Wilmington, Del.) with didecylether of 4,4' biphenol as the gelation agent to form a thermosetting resin that contains 5% by weight gelation agent. The mixture was heated to 100° C. for a sufficient time to dissolve the gelation agent. The resulting mixture was cooled to 30° C. One part of the resin mixture was then combined with two parts of crystallized Ruetapox 0158 particles that are available from Bakelite AG (Duisberg, Germany). The upper size limit of the particles was 2 mm. The resulting resin component can be formed into stable films at room temperature that have acceptable tack and handling properties for use in forming prepreg structures. The viscosity of the resin component at room temperature (25° C.) is sufficiently high to provide the above described acceptable tack and handling properties. When the resin is heated to 60° C., the viscosity dropped significantly to 0.2 Pas.

EXAMPLE 2

A resin component was made in the same manner as EXAMPLE 1 except that the upper size limit of the Ruetapox 0158 particles was 0.3 mm. The viscosity of the resulting resin at room temperature was 57 Pas. When heated to 60° C., the viscosity of the resin dropped to 0.2 Pas. When using solid particles that are relatively small (less than 1 mm), it is preferred that the particles be combined with the resin component by sprinkling the solid particles onto a first film of the resin component. A second film of resin component is then applied over the top to sandwich the particles between the two resin films. The two resin films can be made from the same or different resins.

EXAMPLE 3

DER 337 resin (parts by weight) is mixed with Epikote 1001 (1 part by weight) which is available from Resolution Performance Products (Houston, Tex.). The resulting resin mixture is mixed with didecyl ether of 4,4'-biphenol as the gelation agent and heated to 100° C. to dissolve the gelation agent. Sufficient gelation agent is added to provide a resin mixture that contains 5% by weight of the agent. After cooling to 30° C., 1 part by weight of the resin mixture is combined with 2 parts of crystallized Ruetapox 0158 particles. The upper size limit of the Ruetapox 0158 particles is 0.3 mm. The viscosity of the resulting resin at room temperature is 56 Pas. When heated to 60° C., the viscosity drops to 0.2 Pas. The viscosity of the resin increases to 15 Pas when it is cooled back down to room temperature.

EXAMPLE 4

A 1 mm thick resin film according to Example 1 was combined with layers of an 8H stain weave glass fabric, such as commercially available 7781 glass from Hexcel Fabrics (Les Avenieres, France). The fabric was initially coated with Anchor 1170 to give an equivalent concentration of 10 parts by weight Anchor 1170 for every 100 parts by weight of the resin film. The part was then placed in a vacuum bag for 1 hour at 60° C. to form the fully impregnated cured laminate. The $T_g$ of the cured laminate was a single transition measured as 58° C. (onset E', DMA) which indicates homogeneous curing.

Having thus described exemplary embodiments of the present invention, it should be noted by those skilled in the art that the within disclosures are exemplary only and that various other alternatives, adaptations and modifications may be made within the scope of the present invention. Accordingly, the present invention is not limited to the above preferred embodiments and examples, but is only limited by the following claims.

What is claimed is:

1. A composite material that is suitable for storage at ambient temperatures, said composite material comprising:
   a resin layer comprising an uncured resin component that forms a cured resin when exposed to a curing agent and heated to a resin component curing temperature that is higher than said ambient temperature, said uncured resin component comprising a liquid part including one or more liquid thermosetting resins that have a liquid part curing temperature which is between 10° C. and 60° C. above said ambient temperature and a solid part that comprises particles of one or more solid thermosetting resins wherein said solid part is dispersed within said liquid part, and wherein said particles have a melting point that is above said ambient temperature and below said resin component curing temperature, said uncured resin component further comprising a gelation agent that is present in a sufficient amount to form said liquid part into a gel that is sufficiently gelatinous to maintain said particles in suspension within said liquid part at said ambient temperatures, said gelation agent having a melting temperature that is below said resin component curing temperature and wherein the viscosity of said uncured resin component changes from a high viscosity state to a low viscosity state when the temperature of said uncured resin component is increased from said ambient temperature to said resin component curing temperature and wherein said high viscosity state is substantially more viscous than said low viscosity state;
   a curative layer comprising a curative component that comprises a curing agent for said uncured resin component; and
   a barrier layer that provides separation of said resin layer from said curative layer during storage of said composite material at said ambient temperatures.

2. A composite material according to claim 1 wherein said barrier layer comprises a porous body.

3. A composite material according to claim 2 wherein said barrier layer comprises a layer of woven fabric.

4. A composite material according to claim 1 wherein said barrier layer is removable.

5. A composite material according to claim 1 wherein said resin layer comprises a porous body.

6. A composite material according to claim 5 wherein said resin layer comprises a layer of woven fabric.

7. A composite material according to claim 1 wherein said curative layer comprises a porous body.

8. A composite material according to claim 7 wherein said curative layer comprises a layer of woven fabric.

9. A composite material according to claim 5 wherein said resin layer comprises unidirectional tape.

10. An composite material according to claim 7 wherein said curative layer comprises unidirectional tape.

11. A composite material according to claim 5 wherein said curative layer comprises a porous body.

12. A composite material according to claim 11 wherein said curative layer comprises a layer of woven fabric.

13. A composite material according to claim 6 wherein said curative layer comprises a layer of woven fabric.

14. A composite material according to claim 11 wherein said barrier layer is removable.

15. A composite material according to claim 1 wherein the difference in viscosity between said high viscosity state and said low viscosity state is at least 10 Pas.

16. A composite material according to claim 1 wherein the difference between said ambient temperature and said resin component curing temperature is between 10° C. and 60° C.

17. A method for making a composite material that is suitable for storage at ambient temperatures, said method comprising the steps of:

providing a resin layer comprising and uncured resin component that forms a cured resin when exposed to a curing agent and heated to a resin component curing temperature that is higher than said ambient temperature, said uncured resin component comprising a liquid part including one or more liquid thermosetting resins that have a liquid part curing temperature which is between 10° C. and 60° C. above said ambient temperature and a solid part that comprises particles of one or more solid thermosetting resins wherein said solid part is dispersed within said liquid part, and wherein said particles have a melting point that is above said ambient temperature and below said resin component curing temperature, said uncured resin component further comprising a gelation agent that is present in a sufficient amount to form said liquid part into a gel that is sufficiently gelatinous to maintain said particles in suspension within said liquid part at said ambient temperatures, said glelation agent having a melting temperature that is below said resin component curing temperature and wherein the viscosity of said uncured resin component changes from a high viscosity state to a low viscosity state when the temperature of said uncured resin component is increased from said ambient temperature to said resin component curing temperature and wherein said high viscosity state is substantially more viscous than said low viscosity state;

providing a curative layer comprising a curative component that comprises a curing agent for said uncured resin component; and locating a barrier layer between said resin layer and said curative layer to provide separation of said resin layer from said curative layer during storage of said composite material at said ambient temperatures.

18. A method according to claim 17 wherein said barrier layer comprises a porous body.

19. A method according to claim 17 wherein said resin layer comprises a porous body.

20. A method according to claim 17 wherein said curative layer comprises a porous body.

* * * * *